United States Patent [19]

Furlani et al.

[11] Patent Number: 5,783,879
[45] Date of Patent: Jul. 21, 1998

[54] MICROMOTOR IN A CERAMIC SUBSTRATE

[75] Inventors: Edward P. Furlani, Lancaster; Syamal K. Ghosh; Dilip K. Chatterjee, both of Rochester, all of N.Y.

[73] Assignee: Eastman Kodak Company, Rochester, N.Y.

[21] Appl. No.: 868,098

[22] Filed: Jun. 3, 1997

[51] Int. Cl.$^6$ .............................. H02K 7/00; H02K 9/00; H02K 5/00
[52] U.S. Cl. ................. 310/40 MM; 310/43; 310/89; 310/91; 310/254; 310/258
[58] Field of Search ..................... 310/40 MM, 43, 310/89, 91, 258, 254; 336/83, 205; 396/463

[56] References Cited

U.S. PATENT DOCUMENTS

| | | | |
|---|---|---|---|
| 3,812,442 | 5/1974 | Muckelroy | 336/83 |
| 3,833,872 | 9/1974 | Marcus et al. | 336/83 |
| 4,384,778 | 5/1983 | Lee et al. | 354/230 |
| 5,312,674 | 5/1994 | Haertling et al. | 428/210 |
| 5,399,415 | 3/1995 | Chen et al. | 428/209 |
| 5,483,115 | 1/1996 | Haisma et al. | 310/156 |
| 5,525,941 | 6/1996 | Roshen et al. | 333/112 |
| 5,682,076 | 10/1997 | Zumeris | 310/323 |
| 5,711,221 | 1/1998 | Compera et al. | 310/67 R |

FOREIGN PATENT DOCUMENTS

| | | |
|---|---|---|
| 5335149 | 4/1993 | Japan. |
| 5-152133 | 6/1993 | Japan. |
| 5-335149 | 12/1993 | Japan. |

Primary Examiner—Steven C. Stephan
Assistant Examiner—Tran N. Nguyen
Attorney, Agent, or Firm—Raymond L. Owens

[57] ABSTRACT

A micromotor in a ceramic substrate, including a unitary ceramic body providing a micromotor substrate which has been formed with a first internal cavity and a plurality of second internal cavities and a recess, a ferromagnetic stator formed in the first internal cavity, and embedded conductive coil structures formed in the second internal cavities and disposed in operative relationship to the ferromagnetic stator, and a rotor mechanism mounted in the recess and in operative relationship to the ferromagnetic stator and having a rotor member formed of a hard magnetic material which is free to rotate so that when voltages are applied to the coil structures, a field is created through the ferromagnetic stator which provides a torque to the rotor member causing it to rotate.

10 Claims, 9 Drawing Sheets

MICROMOTOR IN A CERAMIC SUBSTRATE

CROSS REFERENCE TO RELATED APPLICATIONS

Reference is made to commonly-assigned U.S. patent application Ser. Nos. 08/868,210, filed concurrently herewith, entitled "A Method for Making a Micromotor in a Ceramic Substrate by Ghosh et al; 08/798,694 filed Jan. 29, 1997, entitled "A Method for Making a Microceramic Optical Shutter" by Ghosh et al; 08/808,896 filed Jan. 30, 1997, entitled "A Method of Making a Microceramic Electromagnetic Light Shutter" by Ghosh et al; 08/798,080 filed Feb. 12, 1997, entitled "A Microceramic Optical Shutter" by Furlani et al; 08/808,897 filed Feb. 28, 1997, entitled "A Microceramic Electromagnetic Light Shutter" by Furlani et al; and 08/820,064, filed Mar. 18, 1997, entitled "Microceramic Linear Actuator" by Furlani et al, the teachings of which are incorporated herein by reference.

FIELD OF THE INVENTION

The present invention relates to a micromotor in a ceramic substrate.

BACKGROUND OF THE INVENTION

Electromechanical motors are well known in the art and have been used in a number of motion and control applications. It is, of course, highly advantageous to miniaturize such motors. Conventional motors are typically greater that I cubic centimeter in volume. The materials and methods for the fabrication of these motors are inadequate for the fabrication of microelectromechanical motors which are less than I cubic centimeter in volume.

SUMMARY OF THE INVENTION

It is an object of the present invention to provide miniaturized motors which are less than 1 cubic centimeter in volume.

This object is achieved in a micromotor in a ceramic substrate, comprising:

- (a) a unitary ceramic body providing a micromotor substrate which has been formed with a first internal cavity and a plurality of second internal cavities and a recess, a ferromagnetic stator formed in the first internal cavity, and embedded conductive coil structures formed in the second internal cavities and disposed in operative relationship to the ferromagnetic stator, and;

- (b) a rotor mechanism mounted in the recess and in operative relationship to the ferromagnetic stator and having a rotor member formed of a hard magnetic material which is free to rotate so that when voltages are applied to the embedded conductive coil structures, a field is created through the ferromagnetic stator which provides a torque to the rotor member causing it to rotate.

It is a feature of the present invention that miniaturized motors can be fabricated using micromolded ceramic technology.

Micromotors have a number of advantages; they can withstand harsh corrosive or high temperature environments. Another feature of this invention is that by using micromolded ceramic technology, motors can be made in high volume with high yields at reduced cost.

BRIEF DESCRIPTION OF THE DRAWINGS

FIG. 4b shows a cross-sectional view of the top portion of FIG. 4a taken along line A—A in FIG. 4a;

FIG. 10b is a cross-sectional view of the top plug of the rotor mechanism of FIG. 10a taken along line C—C of FIG. 10a, and;

DETAILED DESCRIPTION OF THE PREFERRED EMBODIMENTS

The present invention involves an integrated micromotor in a ceramic substrate. The term "micro" is used to refer to the fact that the volume of the motor itself is on the order of 1 cubic millimeter and internal features within the motor have dimensions of about 100 micrometers or less.

Figure 1:
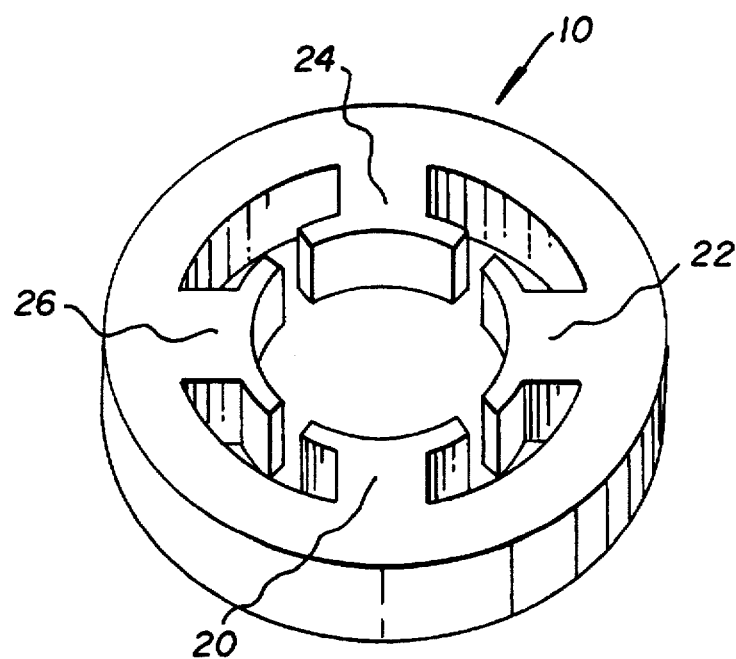
FIG. 1 is a perspective of a sacrificial stator core of a motor in accordance with the present invention.

Referring to FIG. 1, a perspective is shown of a sacrificial stator core 10 comprising a plurality (four shown) of stator teeth 20, 22, 24 and 26. The stator core 10 is made from refractory materials such as tungsten (W), molybdenum (Mo), or Tantalum (Ta).

Figure 2:
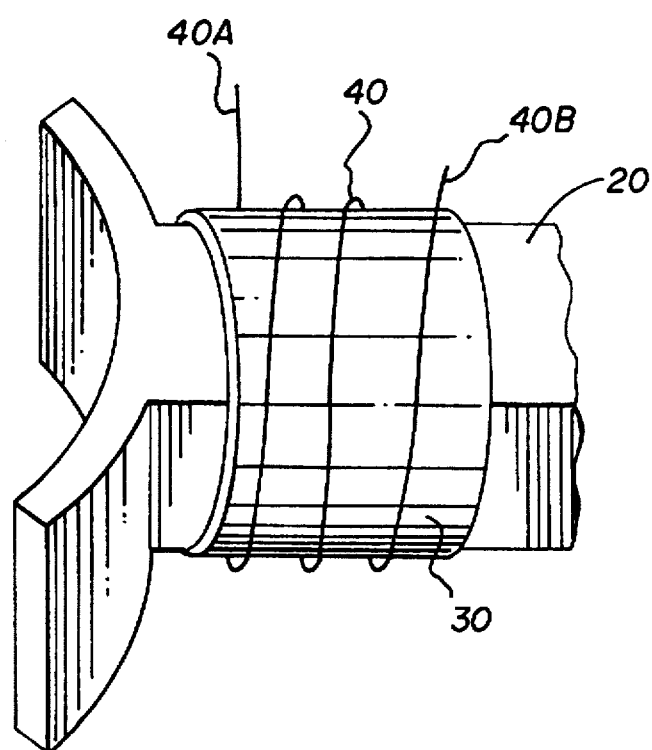
FIG. 2 is a perspective of one of the sacrificial stator core teeth shown in FIG. 1, with a tape cast ceramic material wrapped around its central portion, and a sacrificial fiber wound in a helical fashion on the tape cast material.

Referring to FIG. 2, an intermediate stage of fabrication is depicted showing a perspective of stator tooth 20 of sacrificial stator core 10 after a tape cast ceramic material 30 has been wrapped around its central portion, and a sacrificial fiber 40 has been wound in a helical fashion on the tape cast material 30. The sacrificial fiber 40 is on the order of 100 microns in diameter or less and has end portions 40A and 40B. The sacrificial fiber 40 is made from refractory materials such as tungsten (W), molybdenum (Mo), or Tantalum (Ta). The stator teeth 22, 24, and 26 (not shown) are wrapped in the same fashion with a tape cast ceramic material followed by sacrificial fibers 42, 44, and 46, respectively, having end portions 42A and 42B, 44A and 44B and 46A and 46B, respectively.

Figure 3:
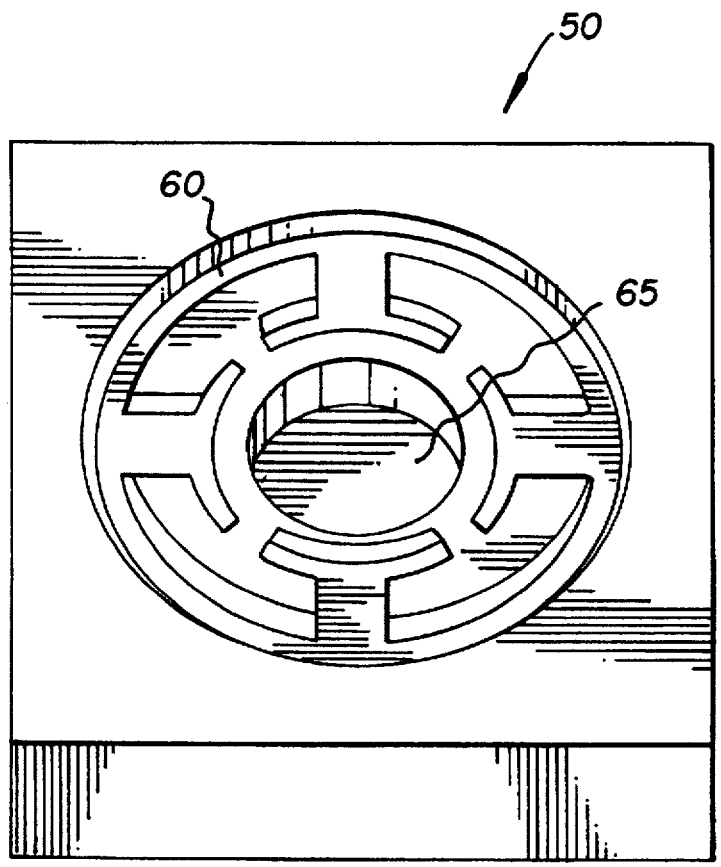
FIG. 3 is a perspective of a micromolded ceramic bottom portion which forms the base element of a microceramic motor in accordance with the present invention.

Referring to FIG. 3 a perspective is illustrated of a micromolded ceramic bottom portion 50 in the green state, with a recess 60 which is formed to receive the stator core 10 with additional space to accommodate the 22% shrinkage of the micromolded ceramic bottom portion 50 which occurs during the sintering process, and an additional recess 65. The use of the term "green" means that particulate ceramic powder, preferably mixed with an organic binder, is subjected to uniform compacting forces in order to provide an unsintered perform which has uniform density. One particular effective material is a tetragonal zirconia ceramic powder that can be micromolded to form the micromolded ceramic bottom portion 50 by standard methods such as injection molding, gel casting, tape casting, dry pressing or cold isostatic pressing. Other ceramic materials which can be used are ceramics such as $Al_2O_3$, $ZrO_2$, AlN, BN, MgO, $Al_2O_3$—$ZrO_2$, SiC, $Si_3N_4$ and other oxide and non-oxide ceramics and their composites thereof.

Figure 4A:
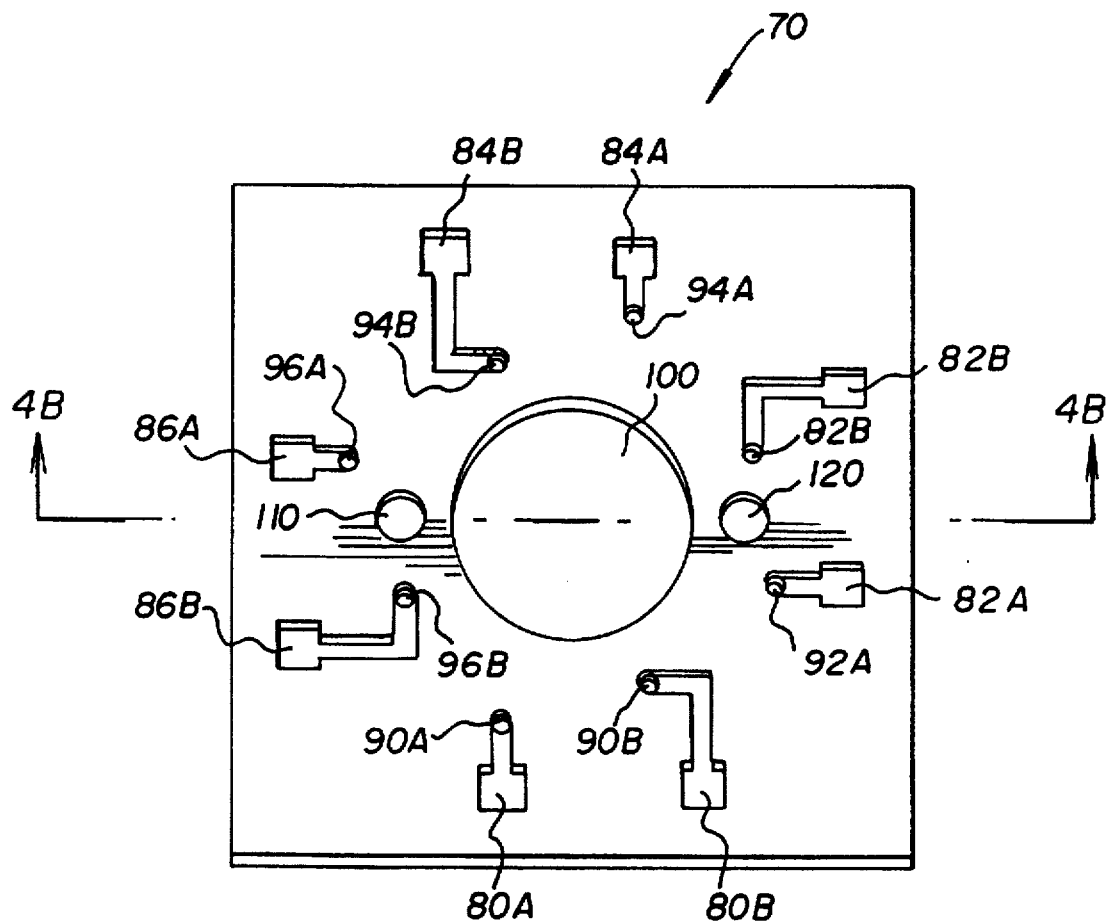
FIG. 4a is a top view of a micromolded ceramic top portion of the present invention.
Figure 4B:
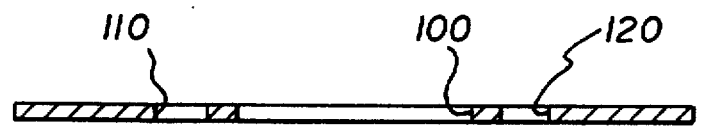

Referring to FIG. 4a a perspective is shown of a micromolded ceramic top portion 70 in the green state is shown. The micromolded ceramic top portion 70 comprises recesses 80A and 80B with respective through-holes 90A and 90B for receiving end portions 40A and 40B of sacrificial fiber 40, respectively; recesses 82A and 82B with respective through-holes 92A and 92B for receiving end portions 42A and 42B of sacrificial fiber 42, respectively; recesses 84A and 84B with respective through-holes 94A and 94B for receiving end portions 44A and 44B of sacrificial fiber 44, respectively; and recesses 86A and 86B with respective through-holes 96A and 96B for receiving end portions 46A and 46B of sacrificial fiber 46. The micromolded ceramic top portion 70 has a central through-hole 100, and additional through-holes 110 and 120 as shown. FIG. 4b illustrates a cross-sectional view of the micromolded ceramic top portion 70 taken along line A—A of FIG. 4a. Features like through-holes and recesses can be formed in the green stage by incorporating those features in the mold. Approximately, 20% to 50% larger features must be made to account for shrinkage during sintering. The amount of shrinkage depends on the relative amount of organic binders in the ceramic mixture. Typically, 2% to 5% by weight organic binders are added for compaction processes such as cold isostatic pressing and dry pressing. On the other hand, 10% to 40% by weight organic binders are added for compaction processes such as gel casting, tape casting and injection molding.

Figure 5A:
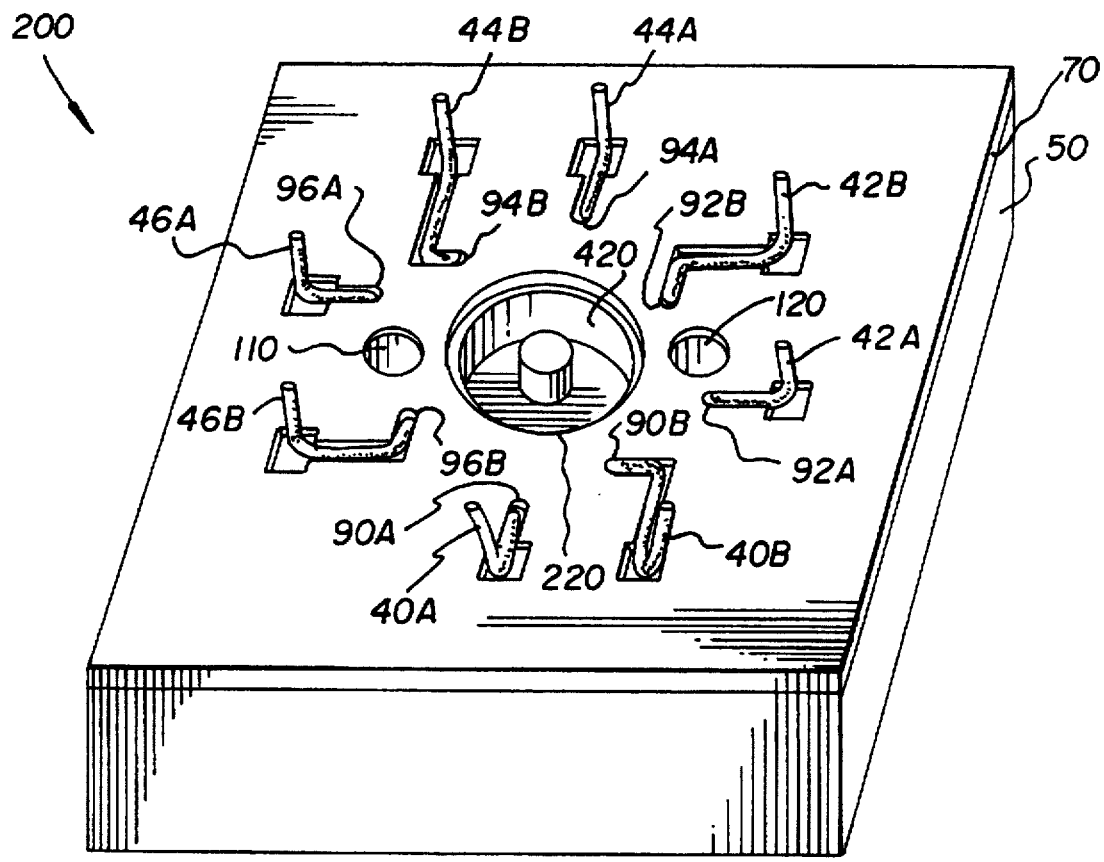
FIG. 5a is a perspective of an assembled motor body prior to sintering.
Figure 5B:
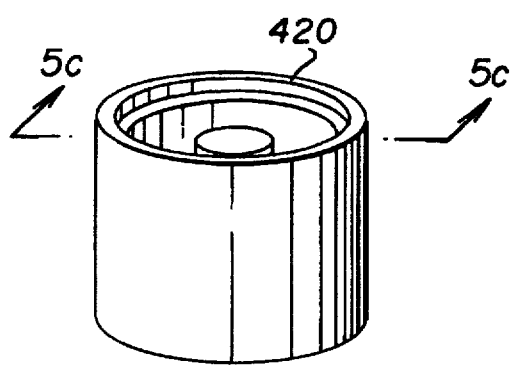
FIG. 5b is a perspective of an insert member which when inserted into the assembled motor mechanism of FIG. 5a provides a bearing surface.
Figure 5C:
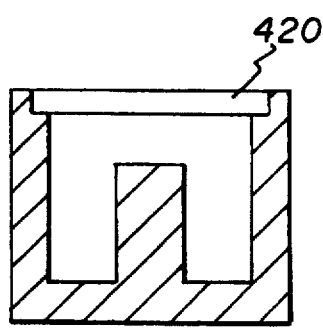
FIG. 5c is a cross-sectional view of the insert member taken along the line B—B of FIG. 5b.

Referring to FIG. 5a, a perspective is illustrated of the assembled ceramic body 200 in which the micromolded ceramic top portion 70 is placed on the micromolded ceramic bottom portion 50. The end portions 40A and 40B of sacrificial fiber 40 are drawn through holes 90A and 90B, respectively; the end portions 42A and 42B of sacrificial fiber 42 are drawn through holes 92A and 92B, respectively; the end portions 44A and 44B of sacrificial fiber 44 are drawn through holes 94A and 94B, respectively, and the end portions 46A and 46B of sacrificial fiber 46 are drawn through holes 96A and 96B, respectively. It is instructive to note that upon assembly of ceramic body 200, through-hole 100 of micromolded ceramic top portion 70 aligns with recess 65 of micromolded ceramic bottom portion 50 forming recess 65, and through-holes 110 and 120 in micromolded ceramic top portion 70 align with stator teeth 22 and 26 of sacrificial stator core 10, respectively. FIG. 5b, illustrates a green ceramic insert 420 comprising $MoSi_2$ or $ZrB_2$. The insert 420 is placed in recess 65. FIG. 5c illustrates a cross-sectional view of the insert sectioned taken along the lines B—B in FIG. 5b.

Once assembled, the assembled ceramic body 200 is sintered in vacuum or in a controlled oxygen-free atmosphere at about 1300° to 1600° C., to form a unitary ceramic body 220 which is a ceramic substrate for the micromotor. After this sintering step, the sacrificial stator core 10 and sacrificial fibers 40, 42, 44 and 46 are etched away using Ammonium Hydroxide $NH_4OH$ or Hydrocloric acid leaving a first internal cavity and a plurality of second internal cavities in their place, respectively. More particularly by etching through the through-holes 90A and 90B, 92A and 92B, 94A and 94B, and 96A and 96B, the sacrificial fibers 40, 42, 44 and 46 are removed to thereby provide a plurality of internal coil receiving cavities, respectively, and by etching through the through holes 110 and 120 the sacrificial stator core 10 is removed to provide a cavity for receiving the ferromagnetic stator member. The construction of embedded structures can also be achieved by molding the green ceramic with a sacrificial plastic members. These sacrificial plastic members burn off during sintering in air. The procedure of providing embedded coils in ceramic body has been described in details by commonly assigned U.S. patent application Ser. No. 08/775,523, filed Jan. 2, 1997, entitled "Miniature Molded Ceramic Devices Having Embedded Spiral Coils" by Chattetjee et al, and commonly assigned U.S. pat. application Ser. No. 08/775,524 filed Jan. 2, 1997, entitled "Method for Forming Molded Ceramic Devices Having Embedded Spiral Coils", by Chatterjee et al, the teachings of which are incorporated herein by reference.

Figure 6:
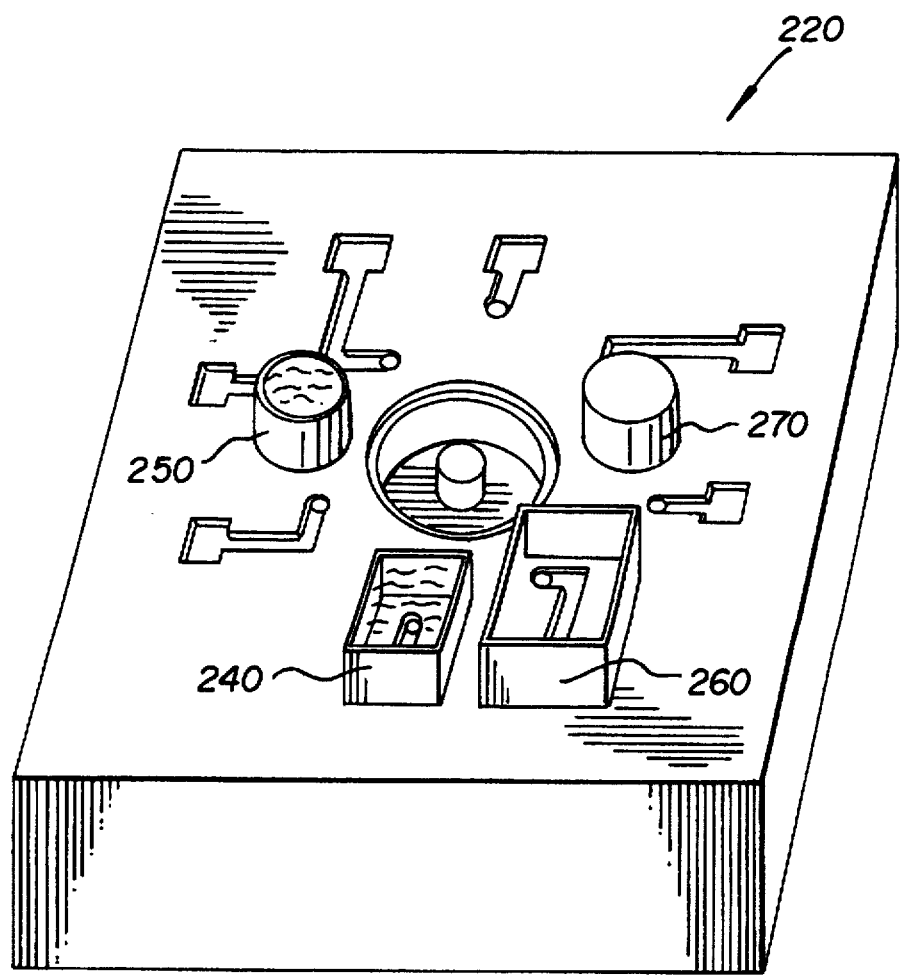
FIG. 6 is a perspective of the structure in FIG. 5a shown after sintering and etching processing and also showing apparatus mounted for filling internal cavities that result from etching away embedded sacrificial members.

Referring to FIG. 6, a perspective is shown of the unitary ceramic body 220 in an intermediate stage of fabrication after the sacrificial fibers sacrificial fibers 40, 42, 44 and 46, and sacrificial stator core 10 have been etched away and apparatus have been mounted for filling the embedded cavities that result from the removal of sacrificial fiber 40 and sacrificial stator core 10. Specifically, nonporous containment structures (dams) 240 and 250 are mounted around through-holes 90A, and 110, respectively. Vacuum chamber structures 260 and 270 are mounted around through-holes 90B and 120, respectively. Containment structure 240 is filed with a molten pool of conductive metal alloy such as Au, Ag, Ag—Cu, or Cu—Sn or alternatively a thin film conductive paste. A vacuum is applied to vacuum chamber structures 260 so as to the draw conductive metal alloy into the embedded etched path connecting through holes 90A and 90B thereby forming an embedded conductive coil structure 180 in the form of wound sacrificial fiber 40 (see FIG. 1) within unitary ceramic body 220 with terminal ends in the form of conductive pads 140A and 140B (shown in FIGS. 7 and 8). This same procedure is used to form embedded conductive coil structures 182, 184, and 186 in the form of sacrificial fibers 42, 44, 46 with terminal ends 142A and 142B, 144A and 144B, and 146A and 146B, respectively (see FIGS. 7 and 8).

Containment structure 250 is filed with a molten pool soft-magnetic alloy such as NiFe. A vacuum is applied to vacuum chamber structures 270 so as to the draw soft-magnetic alloy into the embedded etched path connecting through holes 110 and 120 thereby forming an embedded ferromagnetic stator 190 in the form of sacrificial stator core 10 (see FIG. 1) within unitary ceramic body 220 (see FIG. 8).

Figure 7:
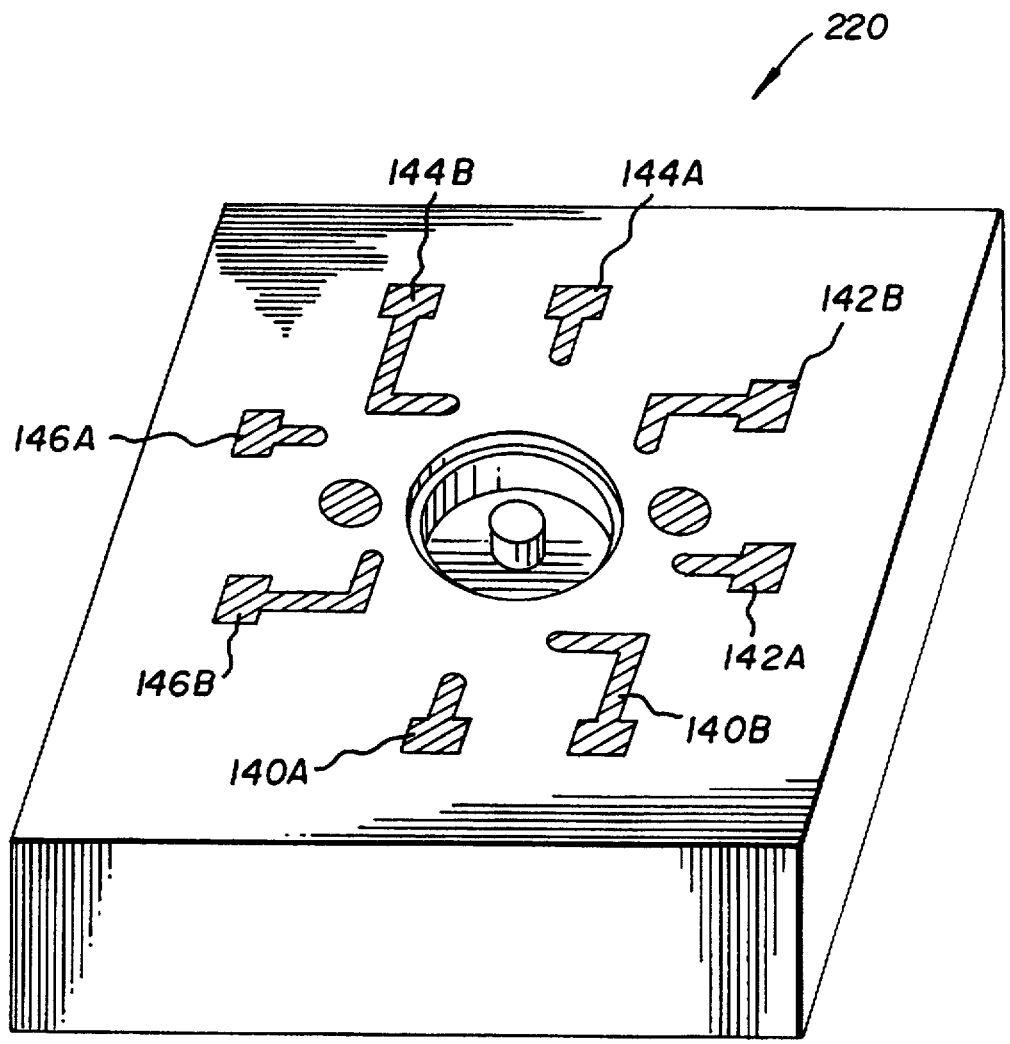
FIG. 7 is a top view of the structure in FIG. 6 after all internal coil receiving cavities and the internal stator receiving cavity have been filled.

Referring to FIG. 7, a top view of the structure in FIG. 6 is shown after all internal coil receiving cavities and the internal stator receiving cavity have been filled. Specifically, conductive pads 140A and 140B, 142A and 142B, 144A and 144B, and 146A and 146B are shown. These form the terminal ends of embedded conductive coil structures 180, 182, 184, and 186 in the form of sacrificial fibers 40, 42, 44, and 46, respectively (see FIG. 8).

Figure 8:
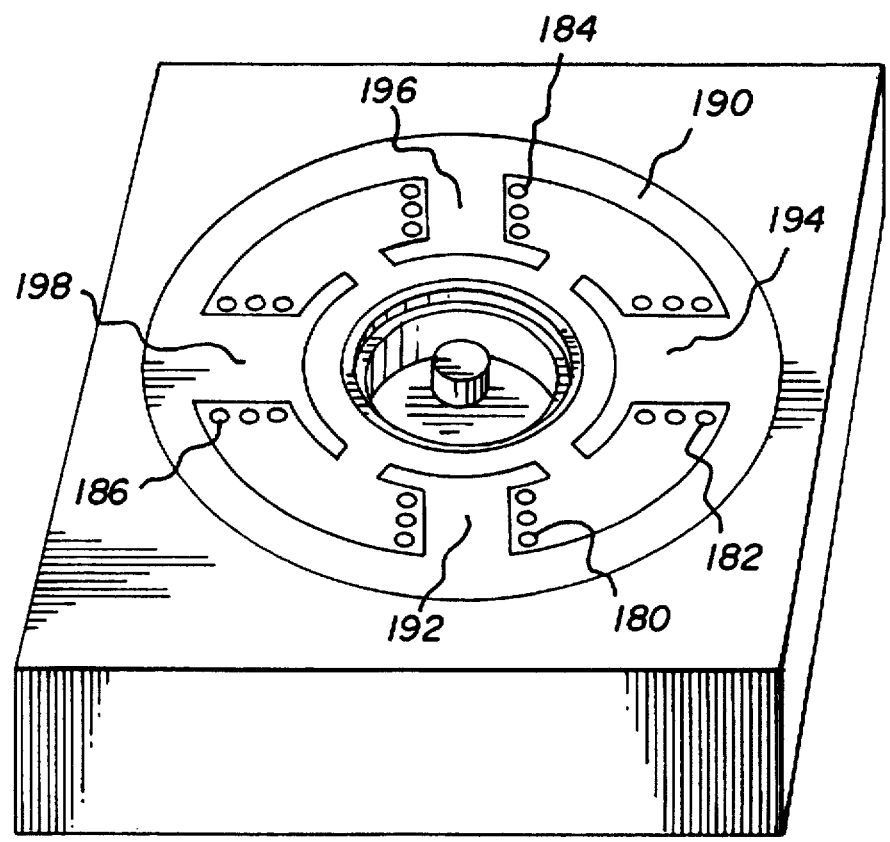
FIG. 8 is an internal cross-sectional view of the structure shown in FIG. 7 showing the internal coil and stator structures.

Referring to FIG. 8 an internal cross-sectional view of the structure shown in FIG. 7 is depicted showing the embedded conductive coil structures 180, 182, 184, and 186 and the ferromagnetic stator 190 with ferromagnetic stator teeth 192, 194, 196 and 198.

Figure 9:
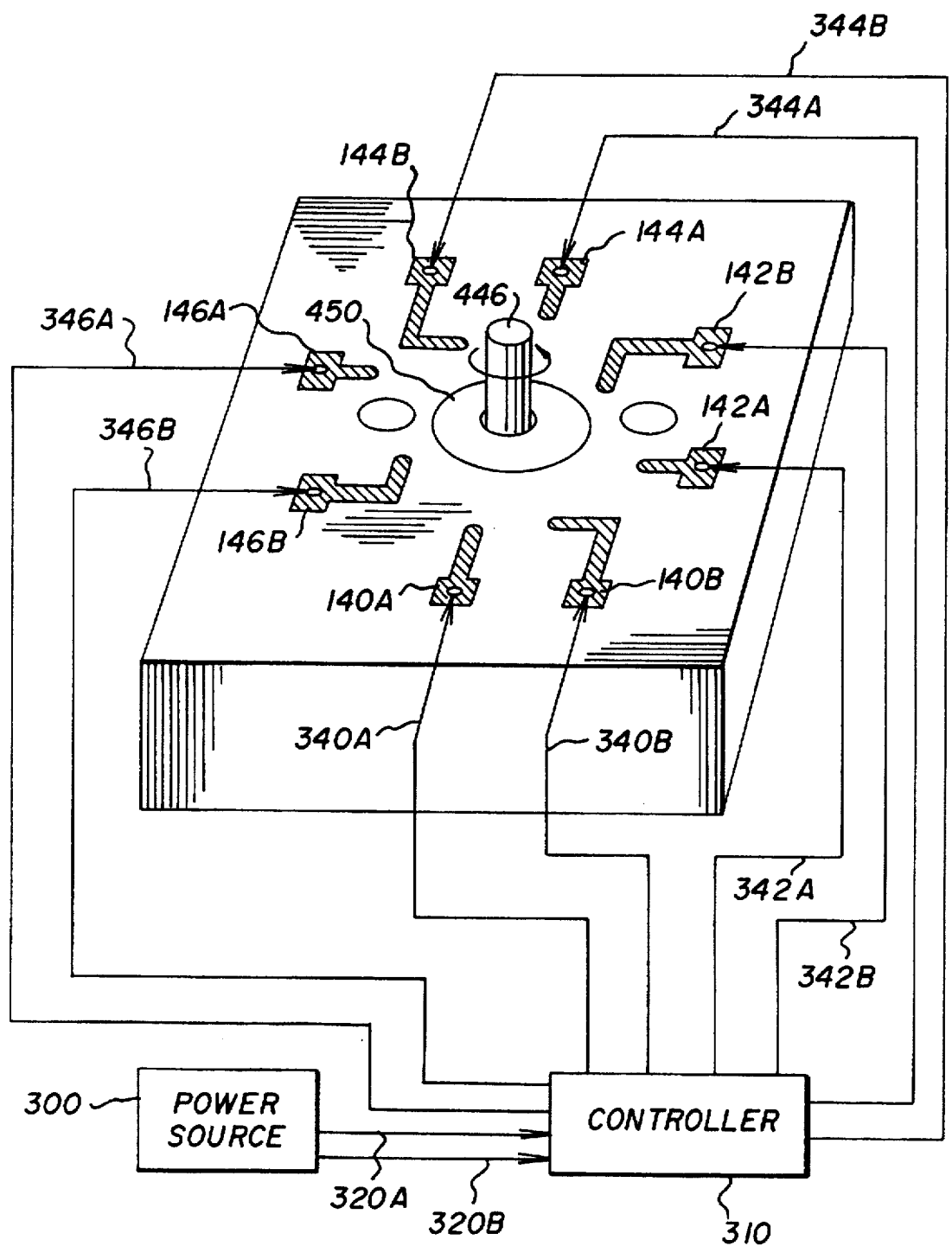
FIG. 9 is a perspective of the assembled motor with attached power source and controller.

Referring to FIG. 9 a perspective is shown of an assembled motor, an external power source 300 and a controller 310. The power source 300 supplies power to the controller 310 through connecting wires 320A and 320B. The controller 310 supplies current to the embedded conductive coil structures 180, 182, 184, and 186 through conductive pads 140A and 140B, 142A and 142B, 144A and 144B, and 146A and 146B via connecting wires 340A and 340B, 342A and 342B, 344A and 344B, and 346A and 346B, respectively. To drive the motor, controller 310 supplies current to the embedded conductive coil structures 180, 182, 184, and 186 in a synchronous fashion, thereby creating a magnetic field in the ferromagnetic stator 190 which, in turn, creates magnetic fields between neighboring ferromagnetic stator teeth 192, 194, 196 and 198 in a synchronous fashion which, in turn, interact with the magnetic field of the permanent magnet rotor member 440 causing it to rotate as is well known (see, for example, "Permanent Magnets and Brushless DC Motors," by T. Kenjo and S. Nagamori, Oxford University Press, 1984).

Figure 10A:
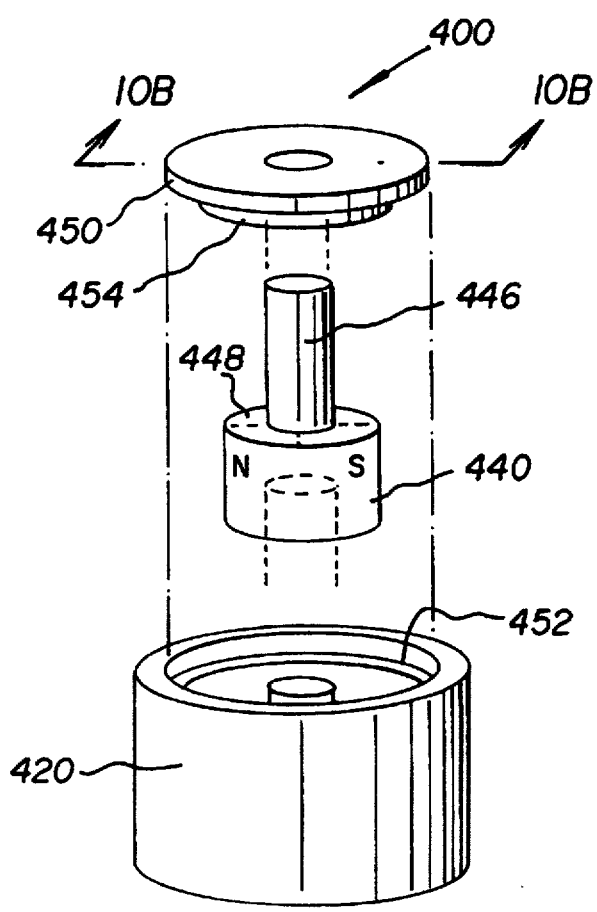
FIG. 10a is an exploded view of the rotor mechanism.
Figure 10B:
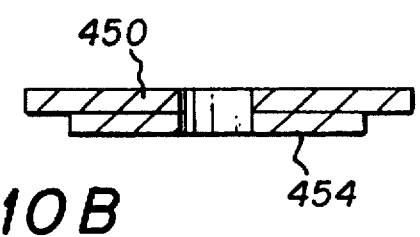

Referring to FIG. 10, an exploded view of rotor mechanism 400 is shown. Rotor mechanism 400 comprises a low friction ceramic insert 420, a rotor member 440 with shaft 446, and a top plug 450. The ceramic insert 420, which is an integral part of the unitary ceramic body 220 provides a lower bearing surface for rotor member 440 for permitting rotation of rotor member 440 with shaft 446. Top plug 450, which is shrunk fit into insert 420, is supported on ledge 452, and has a low friction bearing surface 454 for rotor member 440 while at the same time confining the rotor member 440 to remain within insert 420 during rotation. The rotor member 440 is preferably made from rare earth permanent magnet materials such a neodymium-iron-boron NdFeB, and is radially polarized with alternating north and south poles around its circumference (see FIG. 11).

Figure 11:
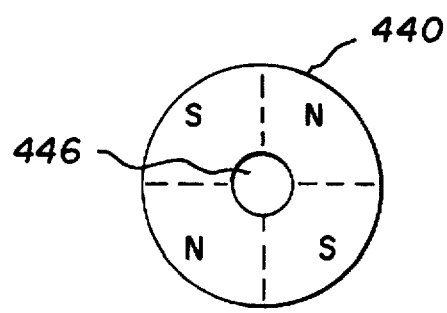
FIG. 11 is a top down perspective of the rotor member of FIG. 10.

Referring to FIG. 11, a top down perspective of rotor member 440 is depicted which shows the polarization pattern around the circumference of rotor member 440 and the cross-section of shaft 446.

The invention has been described in detail with particular reference to certain preferred embodiments thereof, but it will be understood that variations and modifications can be effected within the spirit and scope of the invention.

Parts List 10 sacrificial stator core
20 stator tooth
22 stator tooth
24 stator tooth
26 stator tooth
30 tape cast ceramic material
40 sacrificial fiber
40A end portion
40B end portion
42 sacrificial fiber
42A end portion
42B end portion
44 sacrificial fiber
44A end portion
44B end portion
46 sacrificial fiber
46A end portion
46B end portion
50 micromolded ceramic bottom portion
60 recess
65 recess
70 micromolded ceramic top portion
80A recess
80B recess
82A recess
82B recess
84A recess
84B recess
86A recess
86B recess
90A through-hole
90B through-hole
92A through-hole
92B through-hole
94A through-hole
94B through-hole
96A through-hole
96B through-hole
100 through-hole
110 through-hole
120 through-hole
140A conductive pad
140B conductive pad
142A conductive pad
142B conductive pad
144A conductive pad
144B conductive pad
146A conductive pad
146B conductive pad
180 embedded conductive coil structure
182 embedded conductive coil structure
184 embedded conductive coil structure
186 embedded conductive coil structure
190 ferromagnetic stator
192 ferromagnetic stator tooth
194 ferromagnetic stator tooth
196 ferromagnetic stator tooth
198 ferromagnetic stator tooth
200 assembled ceramic body
220 unitary ceramic body
240 nonporous containment structure
250 nonporous containment structure
260 vacuum chamber structure
270 vacuum chamber structure
300 power source
310 controller
320A connecting wire
320B connecting wire
340A connecting wire
340B connecting wire
342A connecting wire
342B connecting wire
344A connecting wire
344B connecting wire
346A connecting wire
346B connecting wire
400 rotor mechanism
420 insert
440 rotor member
446 shaft 448 top surface
450 top plug
452 ledge
454 bearing surface
464 recess
466 shaft

What is claimed is:

1. A micromotor in a ceramic substrate, comprising:

(a) a unitary ceramic body providing a micromotor substrate which has been formed with a first internal cavity and a plurality of second internal cavities and a recess, a ferromagnetic stator located in the first internal cavity, and embedded conductive coil structures formed in the second internal cavities and disposed in operative relationship to the ferromagnetic stator, and;

(b) a rotor mechanism mounted in the recess and in operative relationship to the ferromagnetic stator and having a rotor member formed of a hard magnetic material which is free to rotate so that when voltages are applied to embedded conductive coil structures, a field is created through the ferromagnetic stator which provides a torque to the rotor member causing it to rotate.

2. A micromotor in a ceramic substrate according to claim 1 wherein the rotor mechanism includes an insert member which provides a bearing surface for the rotor member.

3. A micromotor in a ceramic substrate according to claim 1 wherein the ferromagnetic stator has a plurality of teeth with the embedded conductive coil structures being wound around such teeth.

4. A micromotor in a ceramic substrate according to claim 1 wherein the rotor member is made from rare-earth permanent magnet materials including neodymium-iron-boron and further including a shaft fixed to the rotor member.

5. A micromotor in a ceramic substrate according to claim 1 wherein the insert member is made from low friction ceramic material including $MoSi_2$ or $ZrB_2$.

6. A motor assembly comprising:

(a) a micromotor in a ceramic substrate having:

(i) a unitary ceramic body providing a micromotor substrate which has been formed with a first internal cavity and a plurality of second internal cavities and a recess, a ferromagnetic stator located in the first internal cavity, and embedded conductive coil structures formed in the second internal cavities and disposed in operative relationship to the ferromagnetic stator;

(ii) a rotor mechanism mounted in the recess and in operative relationship to the ferromagnetic stator and having a rotor member formed of a hard magnetic material which is free to rotate so that when voltages are applied to embedded conductive coil structures, a field is created through the ferromagnetic stator which provides a torque to the rotor member causing it to rotate;

(b) a power supply; and (c) means connected to the power supply for selectively applying voltages to the embedded conductive coil structures to cause the rotor member to rotate.

7. A motor assembly according to claim 6 wherein the rotor mechanism includes an insert member which provides a bearing surface for the rotor member.

8. A motor assembly according to claim 6 wherein the ferromagnetic stator has a plurality of teeth with the embedded conductive coil structures being wound around such teeth.

9. A motor assembly according to claim 6 wherein the rotor member is made from rare-earth permanent magnet materials including neodymium-iron-boron and further including a shaft fixed to the rotor member.

10. A motor assembly according to claim 6 wherein the insert member is made from low friction ceramic material including $MoSi_2$ or $ZrB_2$.

* * * * *